(12) United States Patent
Lee et al.

(10) Patent No.: US 10,394,864 B2
(45) Date of Patent: Aug. 27, 2019

(54) METHOD AND SERVER FOR EXTRACTING TOPIC AND EVALUATING SUITABILITY OF THE EXTRACTED TOPIC

(71) Applicant: FOUNDATION OF SOONGSIL UNIVERSITY INDUSTRY COOPERATION, Seoul (KR)

(72) Inventors: Soo Won Lee, Seoul (KR); Joon Ho Noh, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 376 days.

(21) Appl. No.: 15/307,058

(22) PCT Filed: Jul. 29, 2014

(86) PCT No.: PCT/KR2014/006955
§ 371 (c)(1),
(2) Date: Oct. 27, 2016

(87) PCT Pub. No.: WO2015/167074
PCT Pub. Date: Nov. 5, 2015

(65) Prior Publication Data
US 2017/0060997 A1   Mar. 2, 2017

(30) Foreign Application Priority Data
Apr. 28, 2014   (KR) .......................... 10-2014-0050883

(51) Int. Cl.
*G06F 16/33*   (2019.01)
*G06F 16/93*   (2019.01)
(Continued)

(52) U.S. Cl.
CPC .......... *G06F 16/3344* (2019.01); *G06F 15/16* (2013.01); *G06F 16/355* (2019.01); *G06F 16/93* (2019.01); *G06F 17/277* (2013.01)

(58) Field of Classification Search
CPC .... G06F 17/30684; G06F 15/16; G06F 17/00; G06F 17/277; G06F 17/30011; G06F 17/3071
(Continued)

(56) References Cited

U.S. PATENT DOCUMENTS 8,554,618 B1 * 10/2013 Gasch ................ G06Q 30/0241
                                                         705/14.4
9,047,283 B1 *  6/2015 Zhang ............... G06F 17/30663
(Continued)

FOREIGN PATENT DOCUMENTS

JP   2012-221316 A   11/2012
KR  10-2004-0078896 A   9/2004
(Continued)

OTHER PUBLICATIONS

Noh, Jun Ho, "A Word Clustering Method for Regional Topic Extraction," Master's Thesis, Soongsil University, Jan. 29, 2014; (Year: 2014).*
(Continued)

*Primary Examiner* — Evan Aspinwall
(74) *Attorney, Agent, or Firm* — Hauptman Ham, LLP

(57) ABSTRACT

A method and a server for extracting a topic and evaluating suitability of the extracted topic are disclosed. The topic extraction server includes a text preprocessing unit configured to extract noun from a document group and remove stopword from the extracted noun, a keyword extraction unit configured to calculate a weight of a noun and extracting a keyword representing the document group, a seed selection unit configured to calculate a weight of the extracted key-
(Continued)

word and select a seed, an initial clustering unit configured to generate one cluster including the selected seed and a keyword shown by several times in a sentence including the selected seed, and a cluster combination unit configured to extract a topic group.

9 Claims, 11 Drawing Sheets

(51) Int. Cl.
    *G06F 16/35*     (2019.01)
    *G06F 15/16*     (2006.01)
    *G06F 17/27*     (2006.01)

(58) Field of Classification Search
    USPC .......................................................... 707/730
    See application file for complete search history.

(56) References Cited

U.S. PATENT DOCUMENTS

| | | | | |
|---|---|---|---|---|
| 9,460,457 | B1* | 10/2016 | Shaffer | G06Q 30/0276 |
| 2008/0091670 | A1* | 4/2008 | Ismalon | G06F 17/3064 |
| 2009/0119261 | A1* | 5/2009 | Ismalon | G06F 17/3064 |
| 2011/0035403 | A1* | 2/2011 | Ismalon | G06F 17/3064 707/769 |
| 2014/0058722 | A1* | 2/2014 | Sun | G06F 17/2735 704/9 |
| 2015/0248476 | A1* | 9/2015 | Weissinger | G06F 17/30516 707/737 |
| 2015/0379610 | A1* | 12/2015 | Stankiewicz | G06F 17/30696 705/26.7 |

FOREIGN PATENT DOCUMENTS

| | | |
|---|---|---|
| KR | 10-2009-0013928 A | 2/2009 |
| KR | 10-2013-0065871 A | 6/2013 |
| KR | 10-2014-0007004 A | 1/2014 |

OTHER PUBLICATIONS

Noh, Joon-Ho, "A Word Clustering Method for Regional Topic Extraction", Jan. 29, 2014, Department of Computer Science and Engineering Graduate School of Soongsil University, total 57 pages.
International Search Report dated Jan. 14, 2015 corresponding to International Application PCT/KR2014/006955 citing the above reference(s), total 4 pages.

* cited by examiner

FIG. 4 source : media daum news statistics, general popular article
region : gangwon, gyeonggi, gyeongsang, jeolla, jeju, chungcheong
period : 2013.09.01~2013.09.30 a. number of collected regional news

| gangwon | gyeonggi | gyeongsang | jeolla | jeju | chungcheong |
|---|---|---|---|---|---|
| 855 | 894 | 891 | 893 | 897 | 890 |

(a)

| newsbox statistics | popular article | netizen poll | | beeps Up & Down | |
|---|---|---|---|---|---|
| news which many people view | news to which many comments are posted | regional popular article | popular article according to age | popular article according to the press | | whole country  seoul  pusan  daegu  incheon  kwangju  daejeon  ulsan  gyeonggi  gangwon  chungcheong  jeolla  gyeongsang  jeju <2013.08.25>

1. article title, source | article upload time
2. article title, source | article upload time
3. article title, source | article upload time
4. article title, source | article upload time

...

11. article title, source | article upload time
12. article title, source | article upload time (b)

FIG. 5

| gangwon | | | | | |
|---|---|---|---|---|---|
| topic 1 | topic 2 | topic 3 | topic 4 | topic 5 | topic 6 |
| dong yang | cap | Lee seok gi | jeung pyeong | reunion | pregnancy |
| bond | disappearance | rebellion | corpse | delay | woman soldier |
| dongyang group | murder | national intelligence service | handgun | separated families | overwork |

| gyeonggi | | | | | |
|---|---|---|---|---|---|
| topic 1 | topic 2 | topic 3 | topic 4 | topic 5 | topic 6 |
| charter | hyundae car | highway | probation office | beltway around seoul | apple |
| house | strike | stagnation | bundang | collision | iphone |
| trading | | chuseok | seongnam | uijeongbu | new goods |

| gyeongsang | | | | | |
|---|---|---|---|---|---|
| topic 1 | topic 2 | topic 3 | topic 4 | topic 5 | topic 6 |
| breakup | typhoon | miryang | daegu station | daemyeong-dong | hyundae car |
| bond | balloon flower | transmission tower | train | gas | strike |

| jeolla | | | | | |
|---|---|---|---|---|---|
| topic 1 | topic 2 | topic 3 | topic 4 | topic 5 | topic 6 |
| chae dong uk | national intelligence service | typoon | an chul su | basic | kyohaksa |
| prosecution | investigation | balloon flower | new party | pension | history |

| jeju | | | | | |
|---|---|---|---|---|---|
| topic 1 | topic 2 | topic 3 | topic 4 | topic 5 | topic 6 |
| rebellion | typoon | chae dong uk | black | kyohaksa | basic |
| conspiracy | balloon flower | prosecution | yak | textbook | pension |

| chungcheong | | | | | |
|---|---|---|---|---|---|
| topic 1 | topic 2 | topic 3 | topic 4 | topic 5 | topic 6 |
| jeungpyeong | daegu station | high speed | jeungpyeong | rebellion | chae dong uk |
| combat plane | train | highway | hill | conspiracy | prosecution |
| fall | accident | go home | | | |

| gangwon extracted topic | | | gyeonggi extracted topic | | | gyeongsang extracted topic | | |
|---|---|---|---|---|---|---|---|---|
| dongyang | assemblyman | syria | apple | apartment | probation office | miryang | assemblyman | typoon |
| finance | national intelligence service | weapon | market | charter | relocation | resident | national intelligence service | on the sea |
| dongyang group | democratic party | chemistry | iphone | price | seongnam | transmission tower | democratic party | japan |
| company stock | consolidation | | | sales | | construction | consolidation | influence |
| stock | national assembly | | | house | | opposite | | balloon flower |
| affiliate | progressive party | | | monthly rent | | | | |
| group | consent | | | purchase | | | | |
| jeolla extracted topic | | | chungcheong extracted topic | | | jeju extracted topic | | |
| national intelligence service | chief | pension | president | rain | assemblyman | assemblyman | typoon | textbook |
| democratic party | blue house | nation | democratic party | daegu station | democratic party | democratic party | korea | korean history |
| prosecution | prosecution | basic | national assembly | accident | consolidation | national assembly | nearby | kyohaksa |
| intervention | inspection | pieces | park geun hye | | national assembly | saeruri | japan | black |
| case | doubt | | meeting | | | Lee seok gi | balloon flower | education ministry |
| investigation | resign | | | | | | possibility | dispute |

METHOD AND SERVER FOR EXTRACTING TOPIC AND EVALUATING SUITABILITY OF THE EXTRACTED TOPIC

CROSS REFERENCE TO RELATED APPLICATION

This application claims the priority of Korean Patent Application No. 10-2014-0050883 filed on Apr. 28, 2014 in the Korean Intellectual Property Office, the disclosure of which is incorporated herein by reference. Further, this application is the National Phase application of International Application No. PCT/KR2014/006955 filed Jul. 29, 2014, which designates the United States and was published in Korean.

TECHNICAL FIELD

The present disclosure relates to a method and a server for extracting topic and evaluating suitability of the extracted topic.

BACKGROUND ART

A technique for extracting topic from a document group according to a specific classification belongs to a text mining field. The technique has been studied with a technique of summarizing many documents.

For example, the technique analyzes user's interest and characteristic, etc. in accordance with a specific classification, by using an article posted to a social network service such as a twitter and a facebook or various posts provided by a portal enterprise. The analyzed result is useful to make a decision for regional marketing of the enterprise or to establish a government policy.

For example, some services such as the twitter and the facebook provide user's locations in their posts. A daum as a domestic portal enterprise provides a service which collects regional popular news based on location information of a user who searches news provided thereby.

A text data containing the location information may include characteristics such as interest expressed by regional users and figure out difference of the characteristics in those regions according to comparison of the regions.

However, in the conventional technique, it is difficult to determine a parameter value used for extracting the topic. It is impossible to extract accurate topic if proper parameter is not provided.

Accordingly, a technique for increasing accuracy of topic extraction when the topic is extracted from the document group has been required.

SUMMARY

Accordingly, the invention is provided to substantially obviate one or more problems due to limitations and disadvantages of the related art. One embodiment of the invention provides a technique for increasing accuracy of topic extraction when the topic is extracted from a document group.

In one aspect, the invention provides a topic extraction server comprising: a text preprocessing unit configured to extract noun from a document group according to classification information and remove stopword from the extracted noun; a keyword extraction unit configured to calculate a weight of a noun according to removal of the stopword and extracting a keyword which is a word representing the document group by using the calculated weight; a seed selection unit configured to calculate a weight of the extracted keyword and select a seed which is a core word of a cluster formed by clustering the keyword and relative word using the calculated weight; an initial clustering unit configured to generate one cluster including the selected seed and a keyword shown by several times in a sentence including the selected seed based on the selected seed; and a cluster combination unit configured to extract a topic group in accordance with classification by combining similar clusters of the generated clusters.

A frequency of the keyword shown in corresponding document group of the document group according to the classification information is higher than a frequency of the keyword shown in the other document groups.

The seed selection unit selects the seed on the basis of a frequency of a word shown in a document of the document group according to the classification information and a frequency of the document where the word is shown.

The initial clustering unit calculates an association value of the seed and the keyword by using a number of sentences, where both of the seed and the keyword are shown, in the document group according to the classification information, and determining whether or not the initial clustering unit generates one cluster including the seed and the keyword by using average and standard deviation of the association values calculated about every seed of the document group according to the classification information. Here, a critical value $\alpha$ of the average and the standard deviation is further reflected when it is determined whether or not the initial clustering unit generates one cluster.

The cluster combination unit combines two similar clusters to generate a topic when a ratio of a number of a word commonly shown in the similar clusters about a number of a word in a cluster having small size of the similar clusters is higher than a similar cluster combining critical value $\beta$.

In another aspect, the invention provides a server for evaluating suitability of extracted topic using a correct answer topic comprising: an average set precision ASP calculation unit configured to calculate an ASP by calculating similarity between every extracted topic and a correct answer topic group in the same classification as the extracted topic and calculating average of the calculated similarity, the ASP indicating similarity degree of the extracted topic and the correct answer topic; an average set recall ASR calculation unit configured to calculate an ASR by calculating similarity between every correct answer topic and the extracted topic and calculating average of the calculated similarity, the ASR meaning degree of the correct answer topic shown in a group including the extracted topic; and a suitability evaluation unit configured to calculate the suitability $F_{AS}$-measure of the extracted topic based on the ASP and the ASR.

In still another aspect, the invention provides a method of extracting a topic in a server, the method comprising: (a) extracting noun from a document group according to classification information and remove stopword from the extracted noun; (b) calculating a weight of the extracted noun according to removal of the stopword and extracting a keyword which is a word representing the document group by using the calculated weight; (c) calculating a weight of the extracted keyword and selecting a seed which is a core word of a cluster formed by clustering the keyword and relative word using the calculated weight; (d) generating one cluster including the selected seed and a keyword, shown by several times in a sentence including the selected seed, based on the selected seed; and (e) extracting a topic group in accordance with classification by combining similar clusters of the generated clusters.

The step of (d) includes: calculating an association value of the seed and the keyword by using a number of sentences, where both of the seed and the keyword are shown, in the document group; and determining whether or not one cluster including the seed and the keyword is generated by using average and standard deviation of the association values calculated about every seed of the document group. Here, a critical value $\alpha$ of the average and the standard deviation is further reflected when it is determined whether or not one cluster is generated.

The step of (e) includes: combining two similar clusters to generate a topic when a ratio of a number of a word commonly shown in the similar clusters about a number of a word in a cluster having small size of the similar clusters is higher than a similar cluster combining critical value $\beta$.

In still another aspect, the invention provides a method of evaluating suitability of extracted topic using a correct answer topic in a server, the method comprising: (a) calculating an ASP by calculating similarity between every extracted topic and a correct answer topic group in the same classification as the extracted topic and calculating average of the calculated similarity, the ASP indicating similarity degree of the extracted topic and the correct answer topic; (b) calculating an average set recall ASR by calculating similarity between every correct answer topic and the extracted topic and calculating average of the calculated similarity, the ASR meaning degree of the correct answer topic shown in a group including the extracted topic; and calculating the suitability $F_{AS}$-measure of the extracted topic based on the ASP and the ASR.

In one embodiment of the invention, accuracy of topic extraction may be increased when the topic is extracted from a document group according to classification.

Effect of the invention is not to effect mentioned above, and may include every effect capable of being inferred from description or claims of the invention.

BRIEF DESCRIPTION OF DRAWINGS

Example embodiments of the present invention will become more apparent by describing in detail example embodiments of the present invention with reference to the accompanying drawings, in which:

FIG. 4 and FIG. 5 are views illustrating collection result of text data and setting of a correct answer topic according to one embodiment of the invention;

FIG. 8 and FIG. 9 are views illustrating a result of initial clustering and adjustment of a cluster merging parameter according to one embodiment of the invention;

FIG. 11 is a view illustrating final topic extracted by applying an optimal parameter according to one embodiment of the invention.

DETAILED DESCRIPTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Like numbers refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the present specification, terms such as "comprising" or "including," etc., should not be interpreted as meaning that all of the elements or operations are necessarily included. That is, some of the elements or operations may not be included, while other additional elements or operations may be further included.

Hereinafter, various embodiments of the invention will be described in detail with reference to accompanying drawings.

Figure 1:
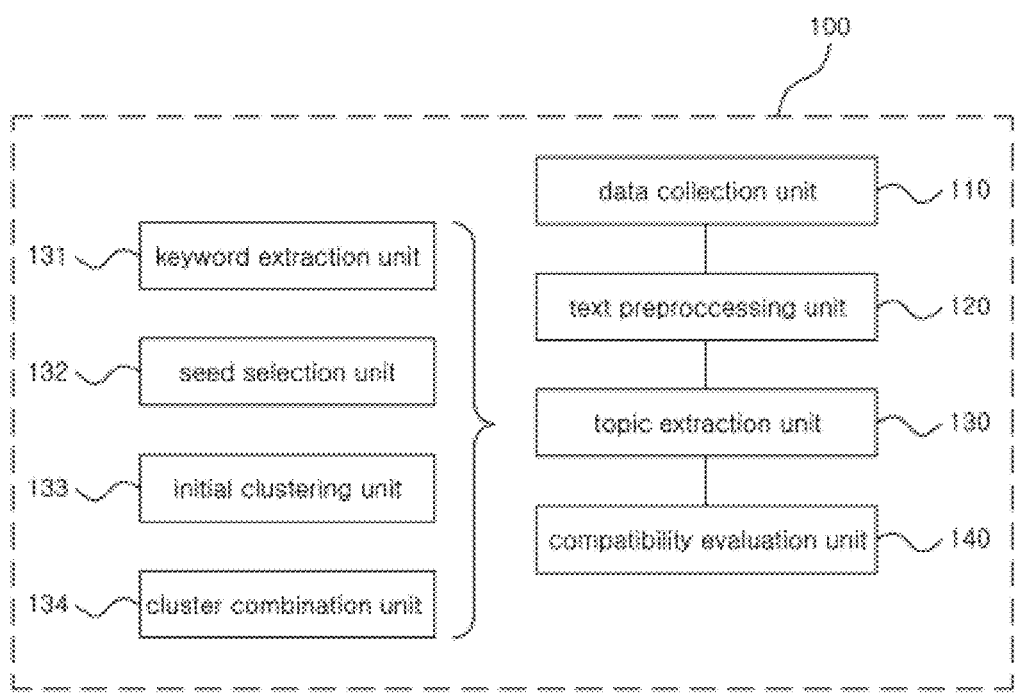
FIG. 1 is a block diagram illustrating a topic extraction server according to one embodiment of the invention.

FIG. 1 is a block diagram illustrating a topic extraction server according to one embodiment of the invention.

A service server 100 (e.g. topic extraction server) of the present embodiment includes a data collection unit 110, a text preprocessing unit 120, a topic extraction unit 130 and a suitability evaluation unit 140. The topic extraction unit 130 includes a keyword extraction unit 131, a seed selection unit 132, an initial clustering unit 133 and a cluster combination unit 134.

The data collection unit 110 may collect text data to which classification information is tagged, and generate document groups according to classification based on the tagged classification information.

Here, the classification information may include a keyword for extracting characteristics or trend of a topic (word group) from the text data. For example, the classification information may include various keywords such as region (location), age, sex, policy, society, sports, hobby and so on.

For example, if the text data to which the region is tagged as the classification information is analyzed, text data related to respective regions such as Seoul, Gyeonggi-do, Gangwon-do, Gyeongsang-do, Jeonlla-do, Jeju-do, Chungcheong-do, etc. may form one regional document group.

The regional document group may be used for extracting a trend of interest or characteristic of respective regions and analyzing differences in the regions. Analysis of the differences is used in marketing, and so high cost-efficiency may be obtained. Additionally, the analysis of the differences may be useful to establish regional policy.

The data collection unit 110 may collect the text data, to which the classification information is tagged for extracting the topic, from posts (news, blog, comment, etc.) in a portal site.

For example, in the event that the classification information is set as the region, the data collection unit 110 may collect regional popular news in the portal site and generate the regional document group based on the collected regional popular news.

Hereinafter, it is assumed that the classification information is set as the region when regional topic is extracted.

However, the classification information is not limited as the region, but diverse keywords other than the region may be used as the classification information.

The text preprocessing unit 120 may remove stopword after extracting noun from the document group generated by the data collection unit 110, so as to effectively use the text data.

Particularly, the text preprocessing unit 120 may extract the noun to extract the topic from the text data, and analyze part of speech of respective words using a morpheme analyzer (not shown) while it is interworking with the morpheme analyzer, so as to extract the noun.

Here, in a morpheme analyzing process, the text preprocessing unit 120 may divide inputted document into tokens by using a whitespace such as blank, tap, line breaking, detect a word corresponding to the token by comparing the tokens with words in a dictionary, and tag part of speech of the detected word to the text data.

The text preprocessing unit 120 may keep the noun and remove words corresponding to other part of speech except the noun, in the text data to which the part of speech is tagged.

The text preprocessing unit 120 may remove the stopword from the above extracted noun.

The noun extracted by analyzing the morpheme may include the stopword not having important meaning or not having discrimination because the stopword is shown in every document group. The stopword raises a problem that an erroneous topic is extracted in a following word clustering process, i.e. a cluster including a word related to multiple topics is generated, and so it should be removed.

Accordingly, the text preprocessing unit 120 may be interworked with a stopword dictionary (not shown), and remove a noun identical to a word included in the stopword dictionary from the extracted noun.

On the other hand, though a specific noun is not identical to the word in the stopword dictionary, it may be determined as the stopword due to characteristic of the text data.

For example, in the event that the text data as a target to be analyzed corresponds to news article, meaningless words such as name of an enterprise providing the news shown in the news article, etc. may be selected as the stopword.

The topic extraction unit 130 may extract keywords based on word weight according to the text data preprocessed by the text preprocessing unit 120, clustering the extracted keywords with relative words and extract the topic in accordance with the classification information based on the clustering.

The topic extraction unit 130 may include the keyword extraction unit 131, the seed selection unit 132, the initial clustering unit 133 and a cluster combination unit 134.

The keyword extraction unit 131 may calculate a weight of a word shown in the document group according to the classification information, and extract the keyword according to the classification information based on the calculated weight.

Here, the keyword means a representative word of the document group according to the classification information, is frequently shown in a specific document group, and is shown with low frequency in the other document groups.

For example, in the event that the classification information corresponds to the region and the document group includes seoul, gyeonggi-do, gangwon-do, gyeongsang-do, jeolla-do, jeju-do and chungcheong-do, a word 'seoul mayor' may be extracted as the keyword of a seoul document group when the word 'seoul mayor' is frequently shown in the seoul document group and is shown with low frequency in a gyeonggi document group, a gangwon-do document group, a gyeongsang-do document group, a jeju document group and a chungcheong-do document group.

The keyword extraction unit 131 may calculate a weight of a word shown in the document group in accordance with the classification information by using following equation 1.

Here, the classification information corresponds to the region. However, other classification information other than the region may be also applied to equation 1.

$$TCW(w_i, l) = tf(w_i, l) \times \log_2\left(2 + \frac{a}{\max\{1, c\}} \times \frac{|L|}{lf(w_i)}\right) \quad \text{[Equation 1]}$$

$$tf(w_i, l) = \sum_{d \in D(l)} f(w_i, d)$$

D(l): document group, to which a region l is tagged, of total collected documents
f($w_j$,d): frequency of a word $w_i$ in a document d
Lf($w_i$): a number of regions corresponding to a document where the word $w_i$ is shown Here, a and c are defined in a cross table including a number of documents where the word $w_i$ is shown, in the document group D(l) corresponding to the region l. The cross table as follows:

TABLE 1

|  | D(l) | D(l̄) |
|---|---|---|
| $w_i$ | a | c |
| $\overline{w_i}$ | b | d |

Here, a means a number of documents where the word $w_i$ is shown in the document group corresponding to the region l, and b indicates a number of documents where the word $w_i$ is not shown.

c means a number of documents where the word $w_i$ is shown in the document group corresponding to regions except the region l, and d indicates a number of documents where the word $w_i$ is not shown in the document group corresponding to the regions except the region l.

The keyword extraction unit 131 may calculate the weight of the word shown in the document group by using equation 1, and arrange words in the document groups in a descending order according to the calculated weight.

Subsequently, the keyword extraction unit 131 may generate a keyword group Keyword(l) corresponding to the region l, the keyword group Keyword(l) including high rank kr percent words arranged in a descending order.

The seed selection unit 132 may select a seed from the keyword group generated by the keyword extraction unit 131.

Here, the seed is a core element of a cluster formed by clustering the keywords with relative words. A number of final topics may be affected by a number of the selected seed.

For example, many topics may exist in one cluster if words related to the topics are clustered as seeds because the selected seed is shown in many documents.

Accordingly, the seed selection unit 132 may select the seed considering a frequency of a word and a frequency of a document where the word is shown. The seed selection unit 132 may use following equation 2 when the seed is selected.

Here, the classification information corresponds to the region. However, other classification information other than the region may be also applied to equation 2.

$$\text{Seed Weight}(w_i, l) = tf(w_i, l) \times \frac{\log_2(df(w_i, l))}{df(w_i, l)} \quad \text{[Equation 2]}$$

$$tf(w_i, l) = \sum_{d \in D(l)} f(w_i, d)$$

$f(w_i,d)$: frequency of the word $w_i$ in the document d
$df(w_i,l) = |\{d \in D(l) | w_i \in d\}|$: a number of documents where the word $w_i$ is shown, of documents corresponding to the region 1

The seed selection unit 132 may calculate the weight of every extracted keyword by using equation 2, arrange the words in the keyword group in a descending order according to the calculated weight, and select high rank sr percent words as the seed.

The initial clustering unit 133 may generate one cluster including the seed selected by the seed selection unit 132 and a keyword shown by several times in a sentence where the selected seed is shown.

The initial clustering unit 133 may calculate association between the seed $s_i$ and the keyword $w_j$ shown in the sentence where the seed $s_i$ is shown. The association may be calculated by association $(s_i, w_j, 1)$ function corresponding to a value calculated by applying a log function to a number of sentences, where the seed $s_i$ and the keyword $w_j$ are together shown, in the document group corresponding to the region 1.

Afterward, the initial clustering unit 133 may determine whether or not it generates one cluster including the seed and a word by using average and standard deviation of association values between every seed corresponding to the region 1 and a word shown with the seed according to the association function.

Here, a parameter α may be used as a parameter for determining a critical value using the average and the standard deviation.

The initial clustering unit 133 may perform initial clustering about given seed by using following equation 3.

$$C_{s_i} = \{s_i\} \cup \left\{ \begin{array}{l} w_j \in \text{Keyword}(l) \mid \mu_{association(l)} + \\ \alpha \times \sigma_{association(l)} < \text{association}(s_i, w_j, l) \end{array} \right\} \quad \text{[Equation 3]}$$

association$(s_i,w_j,l) = \log_2$(a number of sentences including the seed $s_i$ and the keyword $w_j$, in the document group corresponding to the region 1)
$\mu_{association(l)}$ =average of the values calculated by the association function accumulated about every seed corresponding to the region 1
$\sigma_{association(l)}$ =standard deviation of the values calculated by the association function accumulated about every seed corresponding to the region 1

The cluster combination unit 134 may extract final regional topic group by combining similar clusters, about every pair of clusters generated by the initial clustering.

The selected seeds may include words shown by several times in the same sentence. Since clusters generated by the seed clustering unit 133 based on these seeds are similar, a procedure of clustering these clusters is needed.

The cluster combination unit 134 may extract final regional topic group by combining similar clusters while it repeatedly applies equation 4 to every pair of clusters generated by the initial clustering unit 133.

$$\widetilde{Topic}(l, k) = \left\{ C_{s_i} \cup C_{s_j} \; \middle| \; \frac{|C_{s_i} \cap C_{s_j}|}{\min\{|C_{s_i}|, |C_{s_j}|\}} > \beta \right\} \quad \text{[Equation 4]}$$

Equation 4 indicates an equation expressing a condition under which kth topic is generated from the document group corresponding to the region 1. A condition, that a ratio of a number of a word included commonly in a cluster $C_{s_i}$ and a cluster $C_{s_j}$ about a number of a cluster of which size is small is higher than β, should be satisfied so that the cluster $C_{s_i}$ and the cluster $C_{s_j}$ are combined to $\widetilde{Topic}(l,k)$.

The suitability evaluation unit 140 may compare a correct answer topic group with the final topic group obtained by the cluster combination unit 134, and evaluate suitability of the final topic group according to the compared result.

Here, the correct answer topic is used for evaluating the suitability of the final topic group extracted by the cluster combination unit 134. A person may extract a specific number of a topic in accordance with the classification information after he directly reads the document group according to the classification information. A specific number of a keyword may be included in a unit of topics.

For example, in the event that the classification information corresponds to the region and the regional topic is extracted by collecting regional popular news posted to the portal site, the correct answer topic may be achieved by extracting a specific number of regional topics after a person directly reads regional news article during the same period of time as the collected news and setting a specific number of a keyword in a unit of the topic.

The suitability evaluation unit 140 may calculate similarity of every topic automatically extracted by the cluster combination unit 134 and a correct answer topic group of corresponding region and calculate average of the calculated similarity, so as to evaluate the suitability of the final topic group (hereinafter, it is referred as an average set precision ASP).

Here, the ASP may mean correction degree of the final topic automatically extracted by the cluster combination unit 134 about the correct answer topic.

The suitability evaluation unit 140 may calculate similarity of every correct answer topic and the topic extracted automatically in the same region and calculate average of the calculated similarity (hereinafter, it is referred as average set Recall ASR).

Here, the ASR may mean degree of the correct answer shown in the final topic group automatically extracted by the cluster combination unit 134.

The suitability evaluation unit 140 may calculate $F_{AS}$-measure depending on the ASP and the ASR as shown in equation 5, the FAS-measure indicating the suitability of the final topic automatically extracted by the cluster combination unit 134.

$$F_{AS} - \text{measure} = 2 \times \frac{ASP \times ASR}{ASp + ASR} \qquad \text{[Equation 5]}$$

$$ASP = avg_{l \in L} \left\{ avg_{Topic_j(l) \in \hat{T}(l)} \right.$$

$$\left\{ \max_{\widehat{Topic}_j(l) \in T(l)} \left\{ \frac{|\widehat{Topic}_j(l) \cap Topic_i(l)|}{|\widehat{Topic}_j(l) \cup Topic_i(l)|} \right\} \right\} \right\}$$

$$ASR = avg_{l \in L} \left\{ avg_{Topic_i(l) \in T(l)} \right.$$

$$\left\{ \max_{\widehat{Topic}_j(l) \in \hat{T}(l)} \left\{ \frac{|\widehat{Topic}_j(l) \cap Topic_i(l)|}{|\widehat{Topic}_j(l) \cup Topic_i(l)|} \right\} \right\} \right\}$$

T(l): correct answer group about a news document group corresponding to a region l $Topic_i(l)$: ith correct answer topic about the news document group corresponding to the region l $\hat{T}(l)$: topic group automatically extracted from the news document group corresponding to the region l $\widehat{Topic}_j(l)$: jth topic of topics automatically extracted from the news document group corresponding to the region l The suitability evaluation unit 140 is included with the data collection unit 110, the text preprocessing unit 120 and the topic extraction unit 130 in the service server 100, and evaluates the suitability of the final topic automatically extracted by the cluster combination unit 134. However, the suitability evaluation unit 140 may be included in extra evaluation server (not shown), and evaluate the suitability of the final topic automatically extracted by the cluster combination unit 134 or suitability of a topic extracted by another topic extraction device (not shown).

Figure 2:
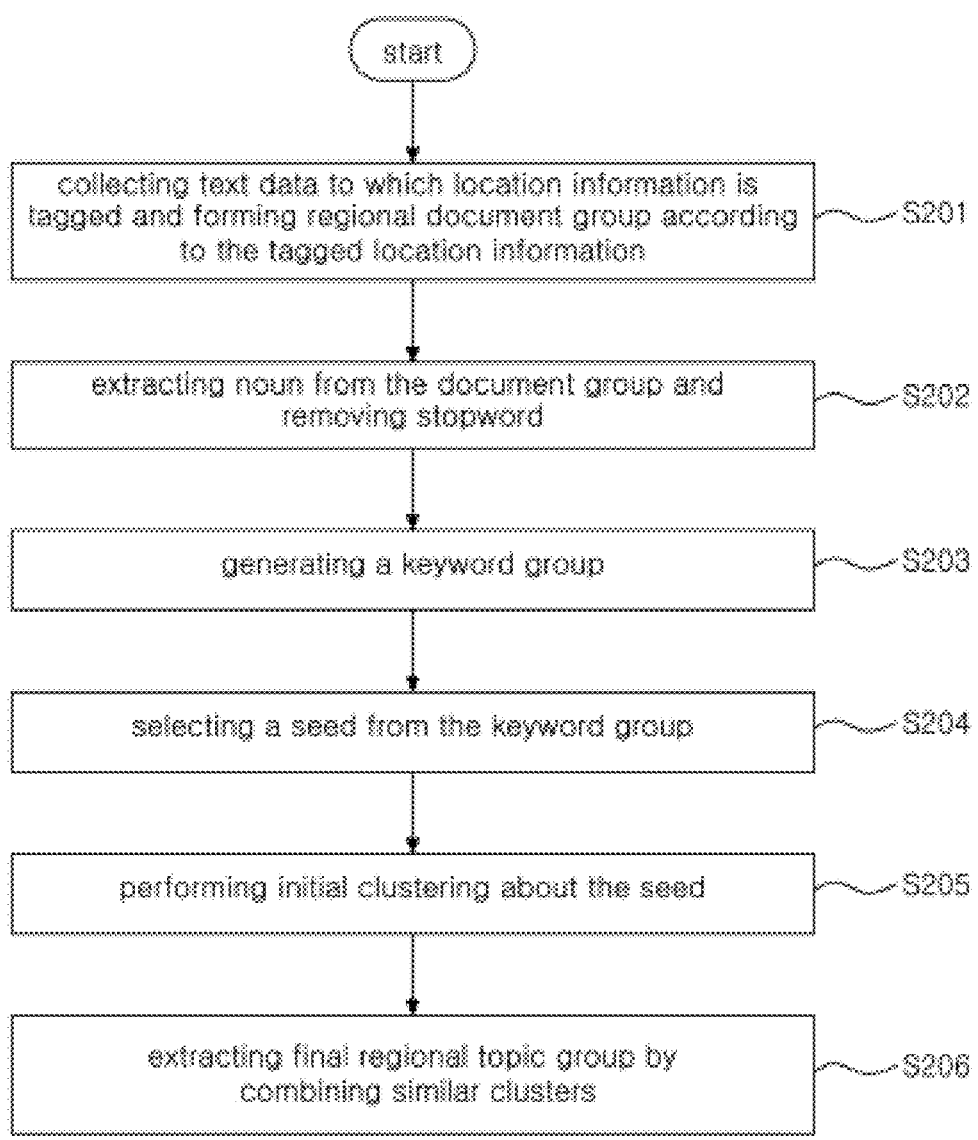
FIG. 2 is a flowchart illustrating a process of extracting a topic according to one embodiment of the invention.

FIG. 2 is a flowchart illustrating a process of extracting a topic according to one embodiment of the invention.

The process in FIG. 2 may be performed by the service server 100. Hereinafter, the process in FIG. 2 will be described in detail on the basis of the service server 100.

The process in FIG. 2 is a procedure of extracting a regional topic. It is assumed that classification information corresponds to a region.

In a step of S201, the service server 100 collects text data to which location information is tagged and generates a regional document group depending on the tagged location information.

In a step of S202, the service server 100 extracts noun from the regional document group and then removes stop-word from the noun.

In a step of S203, the service server 100 calculates a weight of a word shown in the regional document group by using equation 1, and generates a keyword group Keyword (l) corresponding to the region l including high rank kr percent words arranged in a descending order.

In a step of S204, the service server 100 selects a seed from the keyword group considering a frequency of a word and a frequency of a document shown in the keyword group.

This is, the service server 100 may calculate a weight of every keyword from the generated keyword group by using equation 2, arrange words in the keyword group in a descending order according to the calculated weight, and then select high rank sr percent words as the seed.

In a step of S205, the service server 100 performs initial clustering about given seed, thereby forming one cluster including the selected seed and keywords shown by several times in the same sentence as the selected seed.

Here, the service server 100 may calculate association of the seed and the keyword shown in the same sentence as the selected seed by using equation 3, and determine whether or not corresponding keyword is included with the seed in one cluster.

In a step of S206, the service server 100 extracts final regional topic group by combining similar clusters in every pair of clusters generated by the initial clustering.

Here, the service server 100 may extract the final regional topic group by combining similar clusters with applying equation 4 to every pair of clusters generated in the step of S205.

Figure 3:
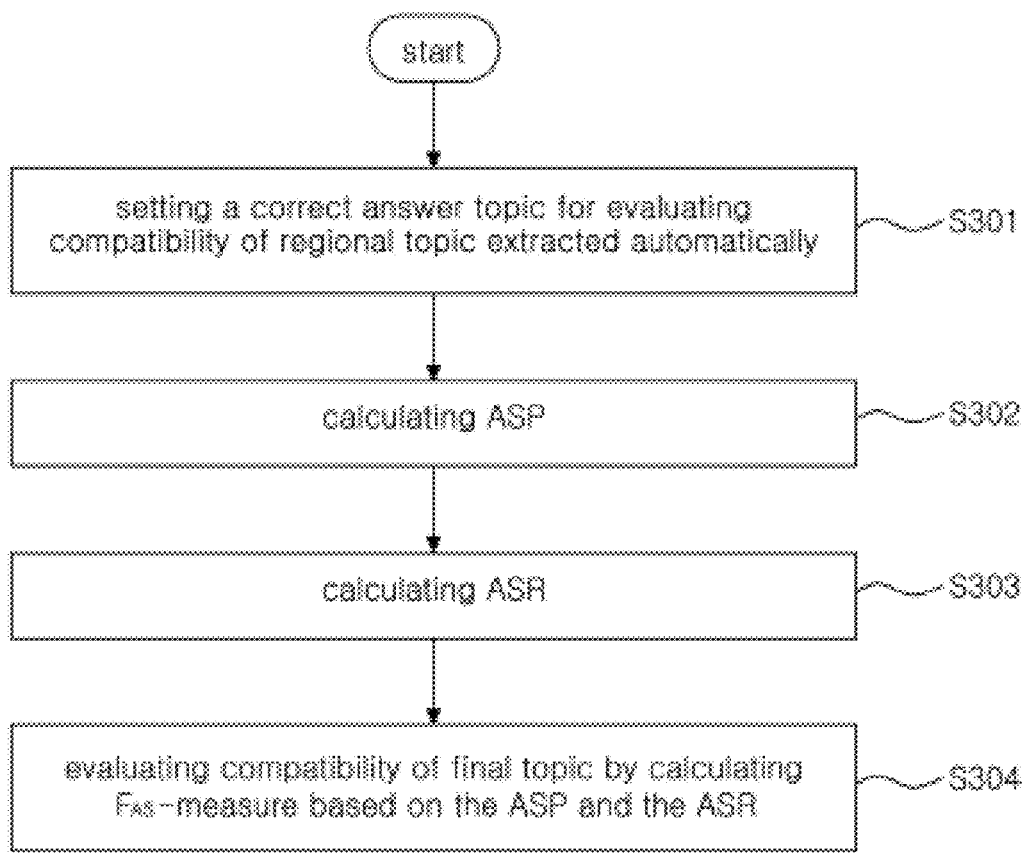
FIG. 3 is a flowchart illustrating a process of evaluating suitability of extracted topic according to one embodiment of the invention.

FIG. 3 is a flowchart illustrating a process of evaluating suitability of extracted topic according to one embodiment of the invention.

The process in FIG. 3 may be performed by the service server 100. Hereinafter, the process in FIG. 3 will be described in detail on the basis of the service server 100.

In a step of S301, the service server 100 sets a correct answer topic for evaluating suitability of a regional topic extracted automatically.

In a step of S302, the service server 100 calculates an ASP which means correction degree of final topic extracted automatically about the correct answer topic.

Here, the ASP may be obtained by calculating similarity between every topic extracted automatically and a correct answer topic group corresponding to the same region and calculating average of the similarity.

In a step of S303, the service server 100 calculates ASR which indicates degree of the correct answer shown in the final topic group automatically extracted.

Here, the ASR may be obtained by calculating similarity between every correct answer topic and a topic, corresponding to the same region, extracted automatically and calculating average of the similarity.

In a step of S304, the service server 100 calculates $F_{AS}$-measure depending on the ASP and ASR, thereby evaluating the suitability of the final topic extracted automatically.

In this case, the service server 100 may calculate $F_{AS}$-measure by using equation 5.

Hereinafter, a method of extracting the regional topic and evaluating the suitability of corresponding topic according to one embodiment of the invention will be described in detail with reference to accompanying drawings FIG. 4 to FIG. 11.

FIG. 4 and FIG. 5 are views illustrating collection result of text data and setting of a correct answer topic according to one embodiment of the invention.

(a) in FIG. 4 shows collection result of regional popular news of news statistics, which is text data including regional information, provided from a media daum (http://media.daum.net), so as to extract regional-dependent topic.

(b) in FIG. 4 illustrates a popular article page of a gangwon region posted by the media daum on Sep. 25, 2013.

Total 13 regions including metropolitan city, metropolitan city and do are given as shown in (b) in FIG. 4. Regional popular articles are provided from a first rank to 30th rank.

In one embodiment, popular articles are provided for six regions including gangwon-do, gyeonggi-do, gyeongsang-do, jeolla-do, jeju-do and chungcheong-do.

FIG. 5 illustrates a correct answer topic compared with a topic extracted automatically by the service server 100 to evaluate the topic. To form the correct answer topic, a person directly read regional news article during the same period of time as the news collected through (a) and (b) in FIG. 4, extracts six topics according to the regions, and sets four to seven keywords in a unit of the topic.

Figure 6:
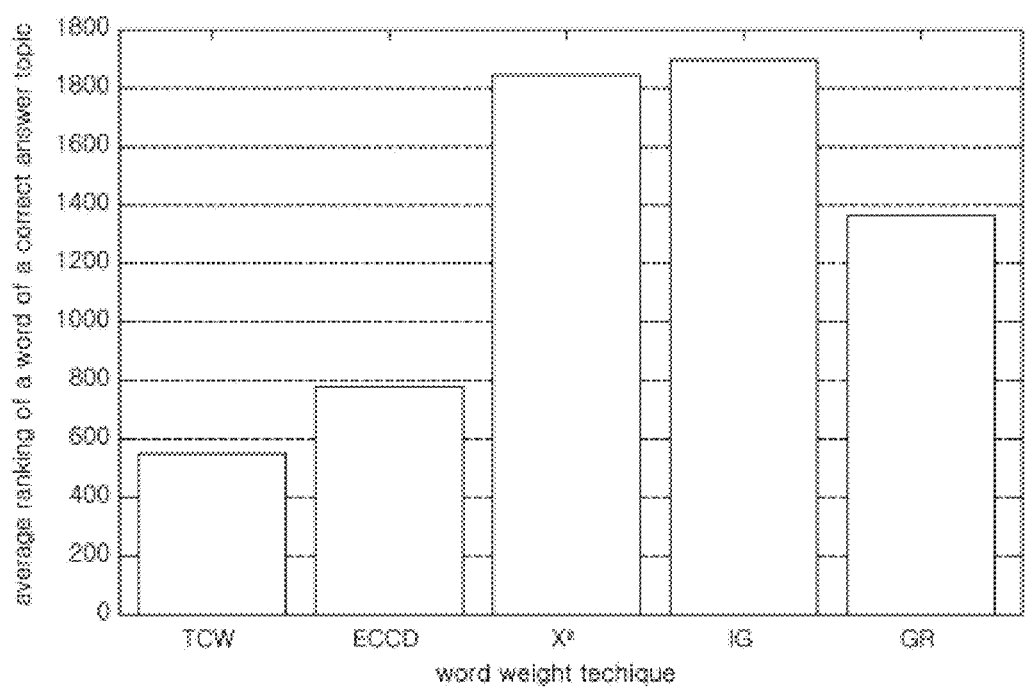
FIG. 6 is a view illustrating experimental result of a word weight technique for selecting a keyword according to one embodiment of the invention.

FIG. 6 is a view illustrating experimental result of a word weight technique for selecting a keyword according to one embodiment of the invention.

FIG. 6 shows experimental result for determining optimal word weight technique for selecting the keyword which is a word representing the regional document group. Word weight techniques used for classifying documents are compared to determine a word weight technique to be used in a process of selecting the keyword.

The compared word weight techniques include TCW in equation 1 according to the invention, and ECCD, $X^2$, information gain IG and gain ratio GR used for classifying the documents.

Average ranking of a word of a correct answer topic according to the word weight techniques is shown in FIG. 6. In the event that the TCW in equation 1 used in the invention is employed, it is verified that words of the correct answer topic are shown in averagely high rank compared with the other weight calculation methods.

Figure 7:
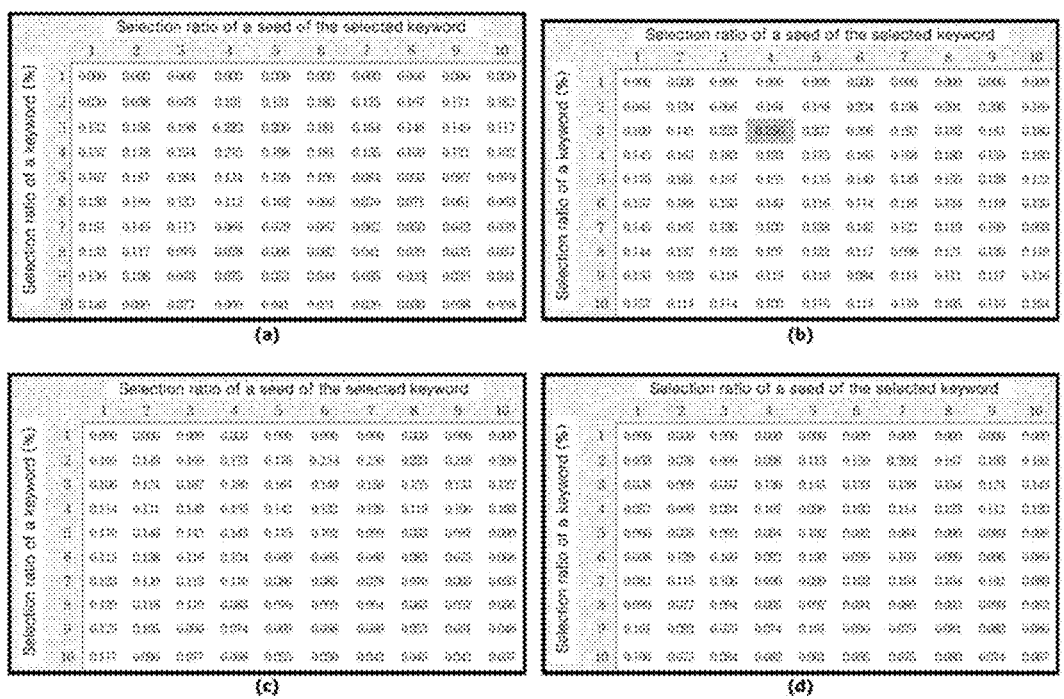
FIG. 7 is a view illustrating experimental result of an association calculation technique for initial clustering according to one embodiment of the invention.

FIG. 7 is a view illustrating experimental result of an association calculation technique for initial clustering according to one embodiment of the invention.

A word association calculation method of the invention in equation 3 used for initial clustering and PMI are compared. The word association calculation method of the invention is calculated by applying a log function to a number of sentences including two words.

In this time, a method of determining a clustering critical value for clustering by using average and standard deviation of association between respective seeds and keywords shown with the seed and a method of determining the clustering critical value by using average and standard deviation of association between every seed and the keyword in the regional document group are used.

The result in FIG. 7 indicates an evaluation result when a topic is extracted through the association calculation method (equation 3 and PMI) and the clustering critical value calculation method (average according to the seed and total average) with changing a keyword selection ratio kr and a seed selection ration sr.

On the other hand, $\alpha$ is fixed to 2.0 in the experiment.

It is verified through (b) in FIG. 7 that the association calculation method has maximum average when a function in equation 3 of the invention is used as the association calculation method, the critical value for clustering is determined by using the average and the standard deviation of association between every seed and the keyword and a topic is extracted by using high rank 3% keyword and high rank 4% seed.

Figure 8:
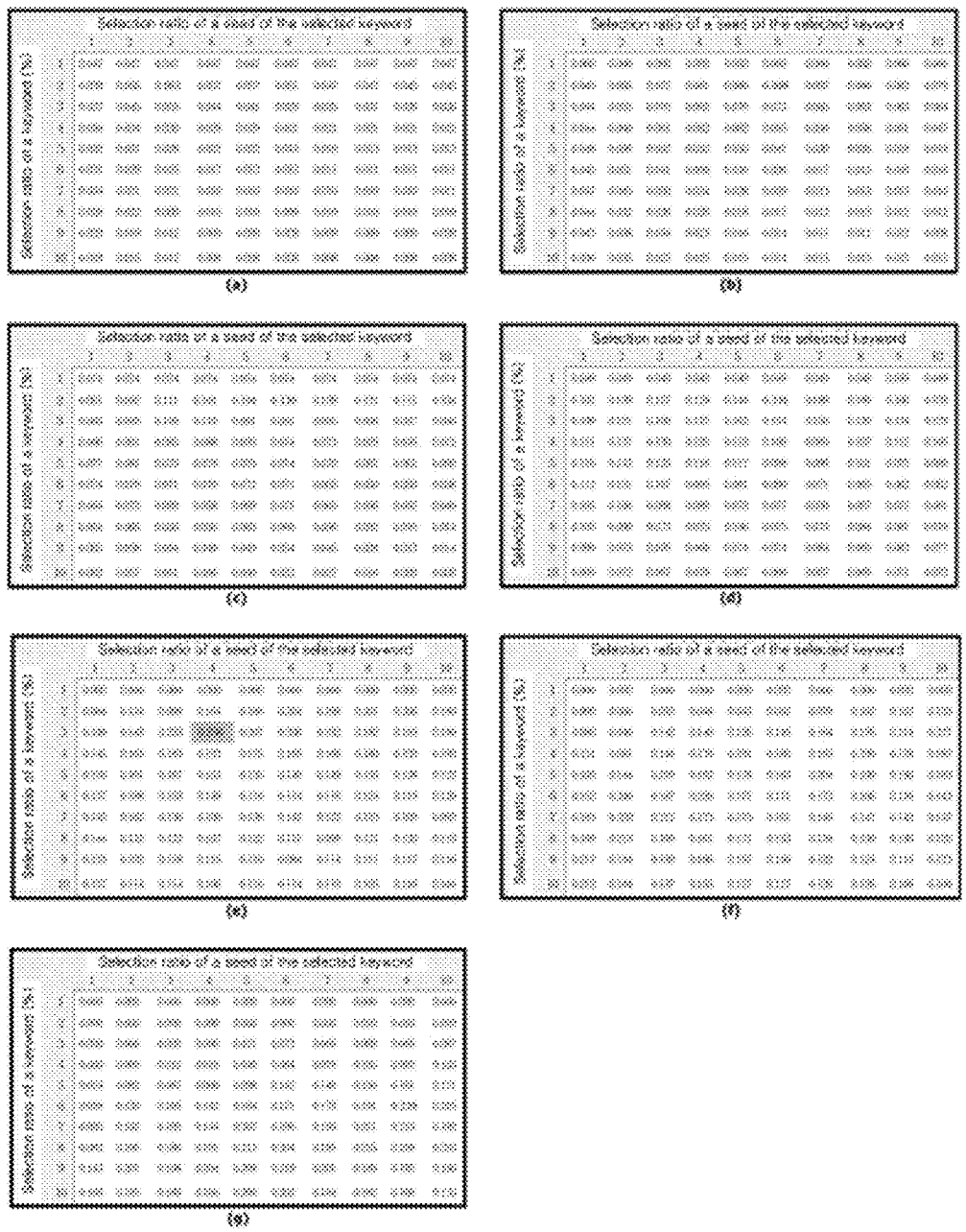
Figure 9:
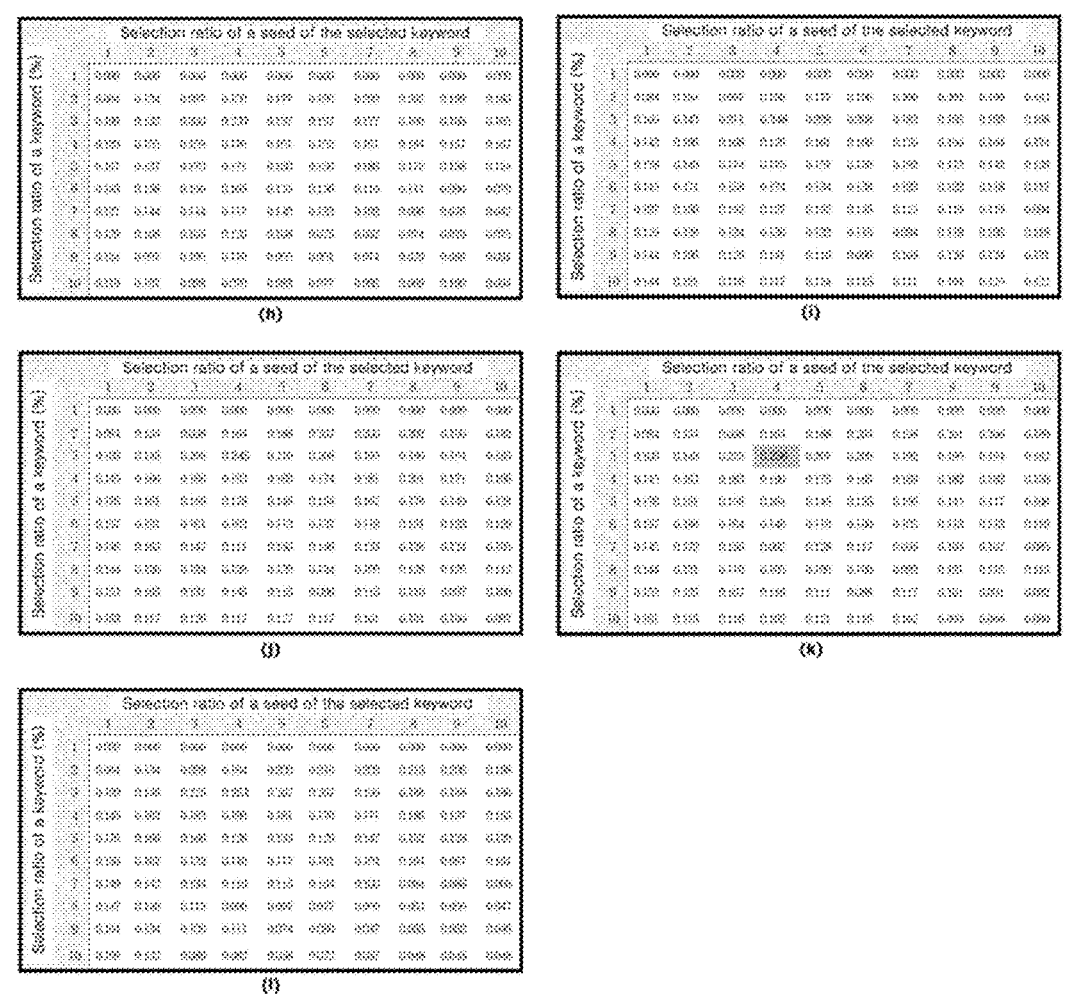

FIG. 8 and FIG. 9 are views illustrating a result of initial clustering and adjustment of a cluster merging parameter according to one embodiment of the invention.

In the experiment, a word clustering critical value $\alpha$ in equation 3 for performing the initial clustering and a similar cluster merging critical value $\beta$ in equation 4 for cluster merging are adjusted. Particularly, $\alpha$ is firstly adjusted, and then $\beta$ is adjusted depending on a result according to the adjusted $\alpha$.

(a) to (g) in FIG. 8 illustrate an evaluation result of suitability of the extracted topic when the keyword selection ration kr, the seed selection ration sr and $\alpha$ are adjusted while $\beta$ is fixed.

It is verified through (e) in FIG. 8 that optimal result is obtained when $\alpha$, kr and sr are 2.0, 3% and 4%, respectively.

(h) to (l) in FIG. 9 show an evaluation result of the extracted topic when the keyword selection ratio kr, the seed selection ratio sr and $\beta$ are adjusted while $\alpha$ is fixed to 2.0, according to the above result.

It is verified through (k) in FIG. 9 that optimal result is obtained when $\beta$, kr and sr are 0.7, 3% and 4%, respectively.

Figure 10:
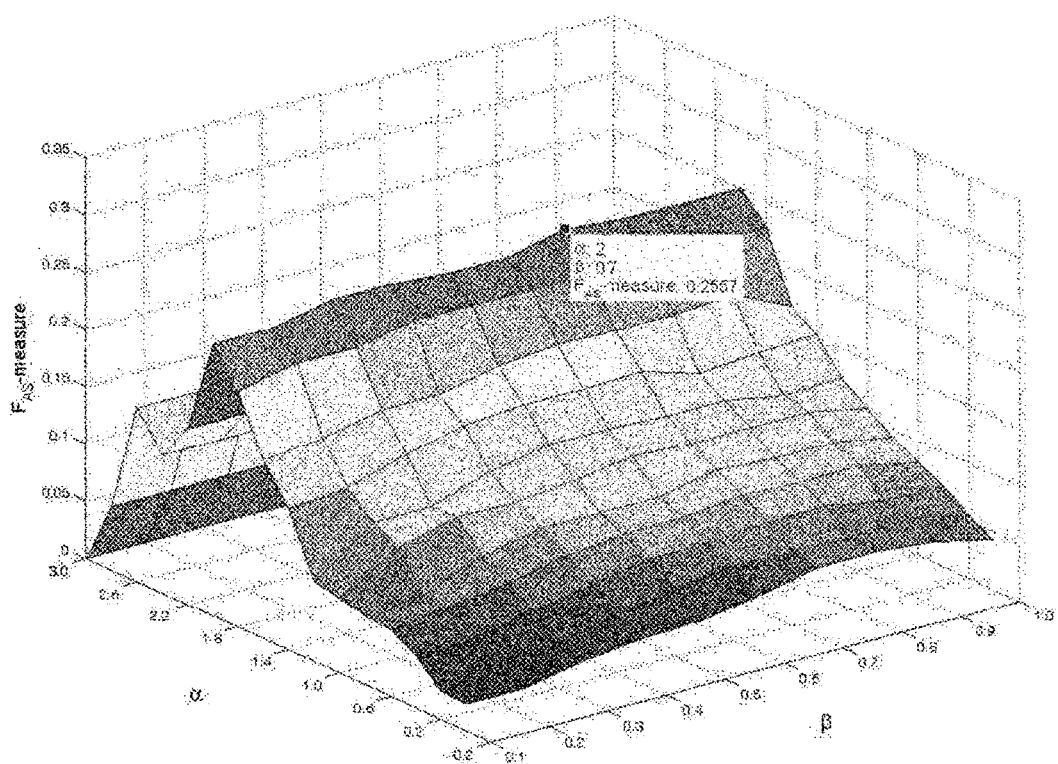
FIG. 10 is a view illustrating a graph showing an evaluation result of suitability of the extracted topic according to one embodiment of the invention.

FIG. 10 is a view illustrating a graph showing an evaluation result of suitability of the extracted topic according to one embodiment of the invention. FIG. 11 is a view illustrating final topic extracted by applying an optimal parameter according to one embodiment of the invention.

FIG. 10 illustrates an evaluation result of the suitability of the extracted topic while $\alpha$ is adjusted from 0 to 3 and $\beta$ is adjusted from 0.1 to 1 under the condition that kr and sr are fixed to 3% and 4%, respectively.

As shown in FIG. 10, it is verified that extraction performance of the topic according to the method of the invention has optimal result when $\alpha$ and $\beta$ are 2.0 and 0.7, respectively.

FIG. 11 shows final regional topic extracted when the optimal parameter in FIG. 10 is applied, i.e. $\alpha$, $\beta$, kr and sr are 2.0, 0.7, 3% and 4%, respectively.

It is verified that the final regional topic is similar to that in FIG. 5.

The embodiments of the invention described above are disclosed only for illustrative purposes. A person having ordinary skill in the art would be able to make various modifications, alterations, and additions without departing from the spirit and scope of the invention.

However, it is to be appreciated that such modifications, alterations, and additions are encompassed by the scope of claims set forth below.

Accordingly, equality of other embodiments and claims are included in the scope of claims set forth below.

The invention claimed is:

1. A topic extraction server comprising:
a text preprocessing unit configured to extract a plurality of nouns from a document group according to classification information and remove a stopword from the extracted nouns;
a keyword extraction unit configured to calculate a first weight of each noun of the nouns in which the stopword is removed and extract a plurality of keywords from the nouns based on the first weight of each noun, wherein the first weight of each noun corresponds to the frequency of each noun in the document group;
a seed selection unit configured to calculate a second weight of each keyword of the extracted keywords and select a seed, among the extracted keywords corresponding to the document group according to the classification information, by clustering the extracted keywords and using the calculated second weight of each keyword of the extracted keywords, wherein the second weight of each keyword corresponds to the frequency of each corresponding document showing the each keyword;
an initial clustering unit configured to generate a cluster including the selected seed and a keyword shown in a sentence including the selected seed; and
a cluster combination unit configured to generate a topic group in accordance with classification by combining two or more clusters of a plurality of clusters generated by the initial clustering unit.

2. The topic extraction server of claim 1, wherein a frequency of the keyword shown in corresponding document group of a plurality of document groups according to the classification information is higher than a frequency of the keyword shown in the other document groups.

3. The topic extraction server of claim 1,
wherein the initial clustering unit calculates an association value of the seed and the keyword by using a number of sentences, where both of the seed and the keyword are shown, in the document group according to the classification information, and determines whether or not the initial clustering unit generates one cluster including the seed and the keyword by using average and standard deviation of the association values calculated about every seed of a plurality of documents groups including the document group according to the classification information, and
wherein a critical value α of the average and the standard deviation is reflected when it is determined whether or not the initial clustering unit generates one cluster.

4. The topic extraction server of claim 1, wherein the cluster combination unit combines two clusters to generate a topic when a ratio of a number of a word commonly shown in the both clusters about a number of a word in a cluster having small size of the both clusters is higher than a similar cluster combining critical value β.

5. A server for evaluating suitability of extracted topic using a correct answer topic, the server comprising:
a text preprocessing unit configured to extract a plurality of nouns from a document group according to classification information and remove a stopword from the extracted nouns;
a keyword extraction unit configured to calculate a first weight of each noun of the nouns in which the stopword is removed and extract a plurality of keywords from the nouns based on the first weight of each noun, wherein the first weight of each noun corresponds to the frequency of each noun in the document group;
a seed selection unit configured to calculate a second weight of each keyword of the extracted keywords and select a seed, among the extracted keywords corresponding to the document group according to the classification information, by clustering the extracted keywords and using the calculated second weight of each keyword of the extracted keywords, wherein the second weight of each keyword corresponds to the frequency of each corresponding document showing the each keyword;
an initial clustering unit configured to generate a cluster including the selected seed and a keyword shown in a sentence including the selected seed; and
a cluster combination unit configured to generate a topic group in accordance with classification by combining two or more clusters of a plurality of clusters generated by the initial clustering unit;
an average set precision (ASP) calculation unit configured to calculate an ASP by calculating similarity between every extracted topic and a correct answer topic group in the same classification as the extracted topic and calculating average of the calculated similarity, the ASP indicating similarity degree of the extracted topic and the correct answer topic;
an average set recall (ASR) calculation unit configured to calculate an ASR by calculating similarity between every correct answer topic and the extracted topic and calculating average of the calculated similarity, the ASR meaning degree of the correct answer topic shown in a group including the extracted topic; and a suitability evaluation unit configured to calculate the suitability $F_{AS}$-measure of the extracted topic based on the ASP and the ASR.

6. A method of extracting a topic in a server, the method comprising:
(a) extracting a plurality of nouns from a document group according to classification information and remove stopword from the extracted noun;
(b) calculating a first weight of each noun of the extracted nouns in which the stopword is removed and extract a plurality of keywords from the nouns based on the first weight of each noun, wherein the first weight of each noun corresponds to the frequency of each noun in the document group;
(c) calculating a second weight of each keyword of the extracted keywords and selecting a seed, among the extracted keywords corresponding to the document group according to the classification information, by clustering the extracted keywords and using the calculated second weight of each keyword of the extracted keywords, wherein the second weight of each keyword corresponds to the frequency of each corresponding document showing the each keyword;
(d) generating a cluster including the selected seed and a keyword, shown in a sentence including the selected shed; and
(e) generating a topic group in accordance with classification by combining two or more clusters of a plurality of clusters generated by the initial clustering unit.

7. The method of claim 6,
wherein the step of (d) includes:
calculating an association value of the seed and the keyword by using a number of sentences, where both of the seed and the keyword are shown, in the document group; and
determining whether or not one cluster including the seed and the keyword is generated by using average and standard deviation of the association values calculated about every seed of a plurality of documents groups including the document group, and
wherein a critical value α of the average and the standard deviation is reflected when it is determined whether or not one cluster is generated.

8. The method of claim 6, wherein the step of (e) includes:
combining two clusters to generate a topic when a ratio of a number of a word commonly shown in the both clusters about a number of a word in a cluster having small size of the both clusters is higher than a similar cluster combining critical value β.

9. The method of claim 6, further comprising:
(f) calculating an average set precision (ASP) by calculating similarity between every extracted topic and a correct answer topic group in the same classification as the extracted topic and calculating average of the calculated similarity, the ASP indicating similarity degree of the extracted topic and the correct answer topic;
(g) calculating an average set recall (ASR) by calculating similarity between every correct answer topic and the extracted topic and calculating average of the calculated similarity, the ASR meaning degree of the correct answer topic shown in a group including the extracted topic; and calculating the suitability $F_{AS}$-measure of the extracted topic based on the ASP and the ASR.

* * * * *